United States Patent
Chandrakar et al.

(10) Patent No.: US 9,928,112 B2
(45) Date of Patent: Mar. 27, 2018

(54) CONFIGURATION OF FLOATING NODE BOUNDARIES

(71) Applicant: International Business Machines Corporation, Armonk, NY (US)

(72) Inventors: Rahul Chandrakar, Bangalore (IN); Saravanan Devendran, Bangalore (IN); Venkatesh Sainath, Bangalore (IN); Amit J. Tendolkar, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 72 days.

(21) Appl. No.: 14/949,975

(22) Filed: Nov. 24, 2015

(65) Prior Publication Data

US 2017/0147409 A1    May 25, 2017

(51) Int. Cl.
*G06F 9/46*    (2006.01)
*G06F 9/50*    (2006.01)
*G06F 9/455*   (2018.01)

(52) U.S. Cl.
CPC ........ *G06F 9/5077* (2013.01); *G06F 9/45541* (2013.01)

(58) Field of Classification Search
CPC ............................ G06F 9/5077; G06F 9/45541
See application file for complete search history.

(56) References Cited

U.S. PATENT DOCUMENTS

| 8,656,018 B1 | 2/2014 | Keagy et al. |
| 8,949,830 B2 | 2/2015 | Kannan et al. |
| 2004/0019883 A1* | 1/2004 | Banerjee ............... G06F 8/4434 717/152 |
| 2007/0150713 A1* | 6/2007 | Almeida ............. G06F 9/30101 713/1 |
| 2010/0217949 A1* | 8/2010 | Schopp ................. G06F 9/5077 711/173 |
| 2010/0325454 A1* | 12/2010 | Parthasarathy ........ G06F 1/3203 713/320 |
| 2012/0254445 A1* | 10/2012 | Kawamoto ........... G06F 9/5088 709/226 |

(Continued)

FOREIGN PATENT DOCUMENTS

EP    2138935 B1    12/2012

OTHER PUBLICATIONS

Wu et al., "Taming Hosted Hypervisors with (Mostly) Deprivileged Execution", Internet Society, Apr. 23, 2013, Associated Event: NDSS Symposium, 2013, 15 pages, <http://www.internetsociety.org/doc/taming-hosted-hypervisors-mostly-deprivileged-execution>.

(Continued)

*Primary Examiner* — Camquy Truong
(74) *Attorney, Agent, or Firm* — Alexa L. Ashworth; A. Imtiaz Billah

(57) ABSTRACT

Embodiments of the present invention provide systems and methods for resource allocation. The systems and methods for resource allocation include: configuring a plan to utilize computer resources; partitioning computer resources; and applying a set of two or more hypervisors, which use a single service processor, to execute the plan to utilize computer resources. The hypervisors facilitate the partitioning of the computer resources, group partitions of the computer resources, control access to nodes, and change node boundaries.

17 Claims, 6 Drawing Sheets

(56) References Cited

U.S. PATENT DOCUMENTS

2013/0159461 A1* 6/2013 Al Faruque ............. H04L 67/16
                                                       709/217
2013/0247042 A1* 9/2013 Bingham ............ G06F 9/45533
                                                       718/1
2015/0040128 A1* 2/2015 Garza ................ G06F 9/45558
                                                       718/1
2017/0090969 A1* 3/2017 Ramasubramanian ... G06F 9/54

OTHER PUBLICATIONS

"HP Hard Partitioning", From Wikipedia, the free encyclopedia, last modified on Aug. 2, 2014, at 06:54, printed on Aug. 27, 2015, 8:58 AM, 2 pages, <https://en.wikipedia.org/wiki/HP_Hard_Partitioning>.

* cited by examiner

CONFIGURATION OF FLOATING NODE BOUNDARIES

BACKGROUND OF THE INVENTION

The present invention relates generally to the field of resource allocation and more specifically to the configuration of floating node boundaries on a multi-node server.

Within multi-node server architectures, the node is defined as a unit of hardware with a processor; memory; and internally and externally connected IO devices. Multiple units of such hardware are interconnected with inter-node cables (e.g., SMP cables). Within server architectures, the workloads (i.e., the amount of processing that the computer has been given to do at a given time) can be hosted on a virtualization layer as multiple partitions or as a virtual machine which is installed directly on hardware rather than within the host operating system (OS). The virtual machine which is installed directly on hardware rather than within the host operation is referred to as "bare metal." The "bare metal" has the operating system running directly on top of the hardware portion.

Not all virtualization layers and server hardware support nested virtualization. Also, server hardware supports several different types of virtualization layers and workloads which are built to work on certain virtualization layers due to the usage of interfaces provided by the virtualization layer. (Power hardware can support PowerVM and Power KVM as the virtualization layer). However, it is possible to run both PowerVM and PowerKVM simultaneously on the same hardware each using their own dedicated resources. Virtual machines are deployed such that they do not cross the hard partitions boundaries. Customers can purchase cells (or physical nodes) in order to upgrade to more resources. The hard partitioning concept requires the cells to be electrically isolated, the granularity of resources to be allocated to a virtual machine is at a cell level, and physical node boundaries which restrict the flow of data. Embodiments of the inventions host multiple hypervisors simultaneously without having a constraint of restricting within a physical node boundary.

There are known methods to manage diverse hypervisors running on different servers via transparent communication; to emulate a data center network on a single physical host by creating multiple virtual hypervisors and virtual machine on a base hypervisor; to migrate one such virtual hypervisor along with the virtual machines to a destination base hypervisor and continue to maintain a nested hypervisor configuration; to stitch two physical nodes in a SMP system with multiple nodes; and reducing the functionality of the hosted hypervisor and install multiple nested hypervisors on top of the hosted hypervisors. There is a need for utilizing a floating node boundary to host multiple hypervisors simultaneously within a multi-node server; utilizing a server plan in conjunction with the floating node boundary; and managing multiple hypervisors running in the same system with a single service processor.

SUMMARY

According to one embodiment of the present invention, a method for resource allocation is provided. The method comprises configuring a plan to utilize computer resources, where the plan is based on a set of one or more partitions. The method further comprises executing the plan to utilize the computer resources. The method further comprises applying a set of two or more hypervisors, which use a single processor, used to run a same system, to the executed plan.

Another embodiment of the present invention provides a computer program product for resource management, based on the method described above.

Another embodiment of the present invention provides a computer system for resource management, based on the method described above.

This may have the advantage of a method for hosting multiple hypervisors simultaneously within a multi-node server without having the constraint of physical node boundary restrictions. Embodiments of the present invention may have the advantage of a method for expanding node boundaries beyond physical inter-node connections via socket level partitioning. Embodiments of the present invention may additionally have the advantage of a method for managing multiple hypervisors running in the same system with a single service processor. Embodiments of the present invention may have the further advantage of a method for a systems management tool to prepare a system plan with floating node boundaries based on the hypervisors and partitions to be deployed on the system. Embodiments of the present invention may have the additional further advantage of a method for a service processor to stitch links and de-configure links based on the provided system plan.

DETAILED DESCRIPTION

Figure 1:
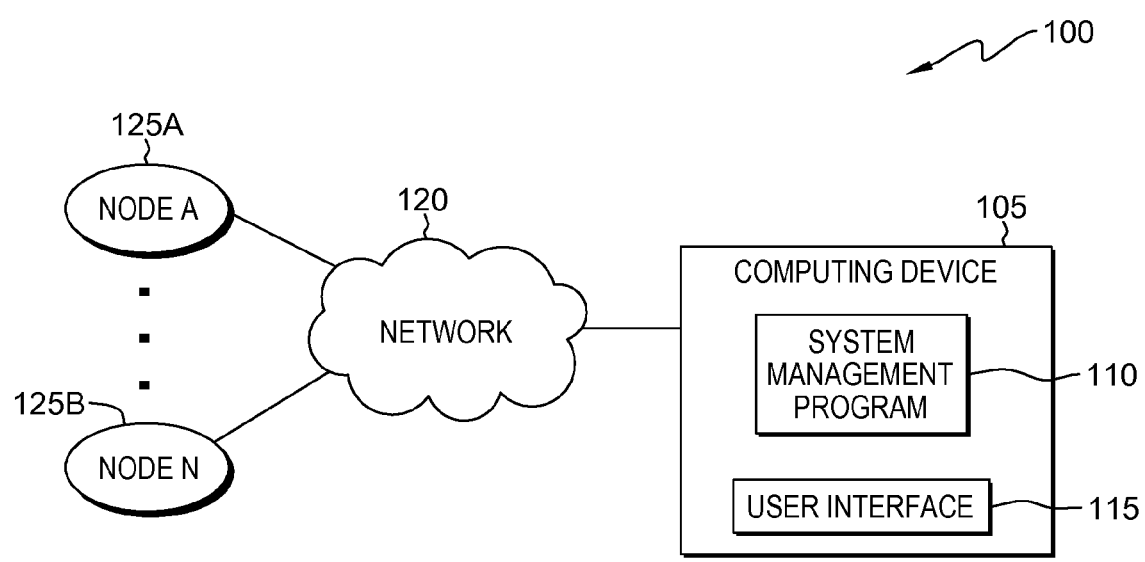
FIG. 1 is a functional block diagram illustrating a data processing environment, in accordance with an embodiment of the present invention.

Virtualization is the act of creating a virtual version of (as opposed to an actual version of) virtual computer hardware platforms, operating systems, storage devices, and computer network resources. Nested virtualization is permitted where there is a second virtualization layer which hosts partitions. Nested virtualization refers to running one or more hypervisors inside another hypervisor. A hypervisor or virtual machine monitor is a piece of computer software, firmware, or hardware that creates and runs virtual machines. Hypervisors (for example, on Hewlett-Packard servers with Intel processors) create electrically isolated partitions. A computer on which a hypervisor is running one or more virtual machines is defined as a host machine. Each virtual machine is called a guest machine. The hypervisor provides the illusion that the guest operating systems (which run above the hypervisor; or within the virtual machine or within the guest machine) are running on the hardware of the guest operating systems. The hardware of guest operating systems is shared with the hypervisor itself, and any other virtual machines running on a host machine. When virtualization extensions are available, illusions are implemented by using the "trap and emulate" technique. The "trap and emulate" technique involves a hypervisor configuring the processor such that any instruction which can "break the illusion" (e.g., access the memory of the hypervisor) generates a "trap." The "trap" interrupts the guest machine and transfers control to the hypervisor. The hypervisor examines the said instruction, "emulates" the said instruction, and allows the guest machine to continue to execute functionalities. Nested virtualization is not implemented when virtualization extensions are not available.

Embodiments of the present invention describe methods and systems for hosting multiple hypervisors simultaneously without having a constraint of restriction within a physical node boundary. In server architectures, workloads can be hosted either on a virtualization layer as multiple partitions or as a bare metal with the operating system running directly on top of the hardware. Not all virtualization layers and server hardware support nested virtualization. Server hardware supports several different types of virtualization layers while workloads are built to work on certain virtualization layers due to the usage of interfaces provided by the virtualization layer. For example, hardware X can support an X virtual machine and X kernel-virtual machine as a virtualization layer. It is possible to simultaneously run both the X virtual machine and X kernel-virtual machine on the same hardware with each using their own dedicated resources (in order to complete workloads). Physical node boundaries impose restrictions which may make it difficult for a system to use resources effectively and complete workloads. Embodiments of the present invention implement a method to have floating (i.e., alterable) node boundaries beyond the established physical inter-node connections. Thus, hypervisors can be hosted within each node with a floating node boundary of a multi-node server. The platform management of the entire multi-node server is done by a single service processor while a user of the multi-node server has the option of hosting different types of workloads on different hypervisors on the same multi-node server (e.g., AIX on X virtual machine on one node and Linux on X kernel-virtual machine on another node).

The principle of nPartitioning is to combine several cells to increase the computing power of a system by adding more memory/processors/IO. Cells or nPartitions are modelled as hard partition boundaries. Virtual machines are deployed such that the virtual machines do not cross the hard partition boundaries. Customers can purchase cells (or physical nodes) in order to upgrade more resources. The hard partitioning concept requires the cells to be electrically isolated. The granularity of resources (allocated to a virtual machine) is always at a cell level and hard partition boundaries do not cross a physical node. Within the same chassis, nPartitioning contains electrically isolated partitions. Embodiments of the present invention allow the isolation granularity level to be brought down to a socket granularity level it improves and implements partitioning of a multi-node server at socket granularity to run different hypervisors. This invention proposes partitioning of a multi-node server at socket granularity, and enable the partitions to run different hypervisors. The different hypervisors (e.g., a virtual machine and a kernel-based virtual machine) run on the same multi-node server with socket level partitioning. By facilitating the co-existence of two or more hypervisors on a batch processing (i.e., the execution of a series of programs on a computer without manual intervention) machine and enabling the partitioning of a multi-node server, the hypervisors behave as two different servers. Hard-Partitioning is usually associated with electrically isolated partitions. In this disclosure, electrically isolated partitions are not invoked in the mechanism to draw floating boundaries. Instead, socket granularity is invoked in the mechanism to draw floating boundaries for each hypervisor. While one hypervisor or the workload on that hypervisor cannot access the data belonging to another hypervisor or the workload running on that hypervisor, the partitions themselves are not electrically isolated.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes nodes 125A-N and computing device 105 connected by network 120.

Nodes 125A-N are defined as units of hardware with a processor; memory; internally and externally connected IO devices with a multi-node server. Nodes are devices (e.g., personal computers, cell phones, or printers) or data points on a larger network. In a data communication environment, a network node may either be data communication equipment (DCE) such as a modem, hub, bridge or switch; or data terminal equipment (DTE) such as a digital telephone handset, a printer, or a host computer (e.g., router, a workstation, or a server). In an Internet or an Intranet environment, network nodes are host computers (i.e., Internet nodes) identified by an IP address and all hosts are physical network nodes. However, some datalink layer devices such as switches, bridges, and WLAN access points do not have an IP host address (except sometimes for administrative purposes) and are not considered to be Internet nodes or hosts, but as physical network nodes and LAN nodes. Within a "vast" computing environment, the computers on the periphery of a network, the computers that do not also connect other networks, and the computers that often connect transiently to one or more clouds, are called end nodes. A distributed system is a software system in which components located on networked computers communicate and coordinate actions by passing messages where the nodes are clients (i.e., computer hardware or software that accesses a service); servers (i.e., computer program or a machine capable of accepting requests from clients and responding to requests); or peers (i.e., computing or networking which is a distributed application architecture that partitions tasks or workloads between equally privileged and equipotent participants in the distributed application). In an exemplary embodiment, the term "node" refers to a Symmetric Multi-Processing (SMP) node in a multi-drawer server (e.g., POWER8 E880).

Network 120 can be, for example, a local area network (LAN), a wide area network (WAN) such as the Internet, or a combination of the two, and can include wired, wireless, or fiber optic connections. In general, network 120 can be any combination of connections and protocols that will support communication between computing device 105 and nodes 125A-N.

Computing device 105 includes system management program 110 and user interface 115. Computing device 105 may be a laptop computer, a tablet computer, a netbook computer, a personal computer (PC), a desktop computer, a personal digital assistant (PDA), a smart phone, a thin client, or any programmable electronic device capable of communicating with system management program 110. Computing device 105 may include internal and external hardware components, as depicted and described in further detail with respect to FIG. 6.

User interface 115 may be for example, a graphical user interface (GUI) or a web user interface (WUI) and can display text, documents, web browser windows, user options, application interfaces, and instructions for operation, and includes the information (such as graphics, text, and sound) a program presents to a user and the control sequences the user employs to control the program. User interface 115 is capable of receiving data, user commands, and data input modifications from a user and is capable of communicating with system management program 110.

System management program 110 has the following functionalities and/or characteristics: (i) hosting multiple hypervisors simultaneously within a multi-node (i.e., symmetric multiprocessing) server; (ii) does not have the constraint of physical node boundary restrictions inherent in the multi-node server; (iii) expanding node boundaries beyond physical inter-node connections via socket level partitioning; (iv) managing multiple hypervisors running in the same system with a single service processor; (v) preparing a system plan with floating node boundaries based on the hypervisors and partitions to be deployed on the system; and/or (vi) based on the provided system plan, utilizing a service processor to stitch links between nodes and de-configure links between.

Figure 2:
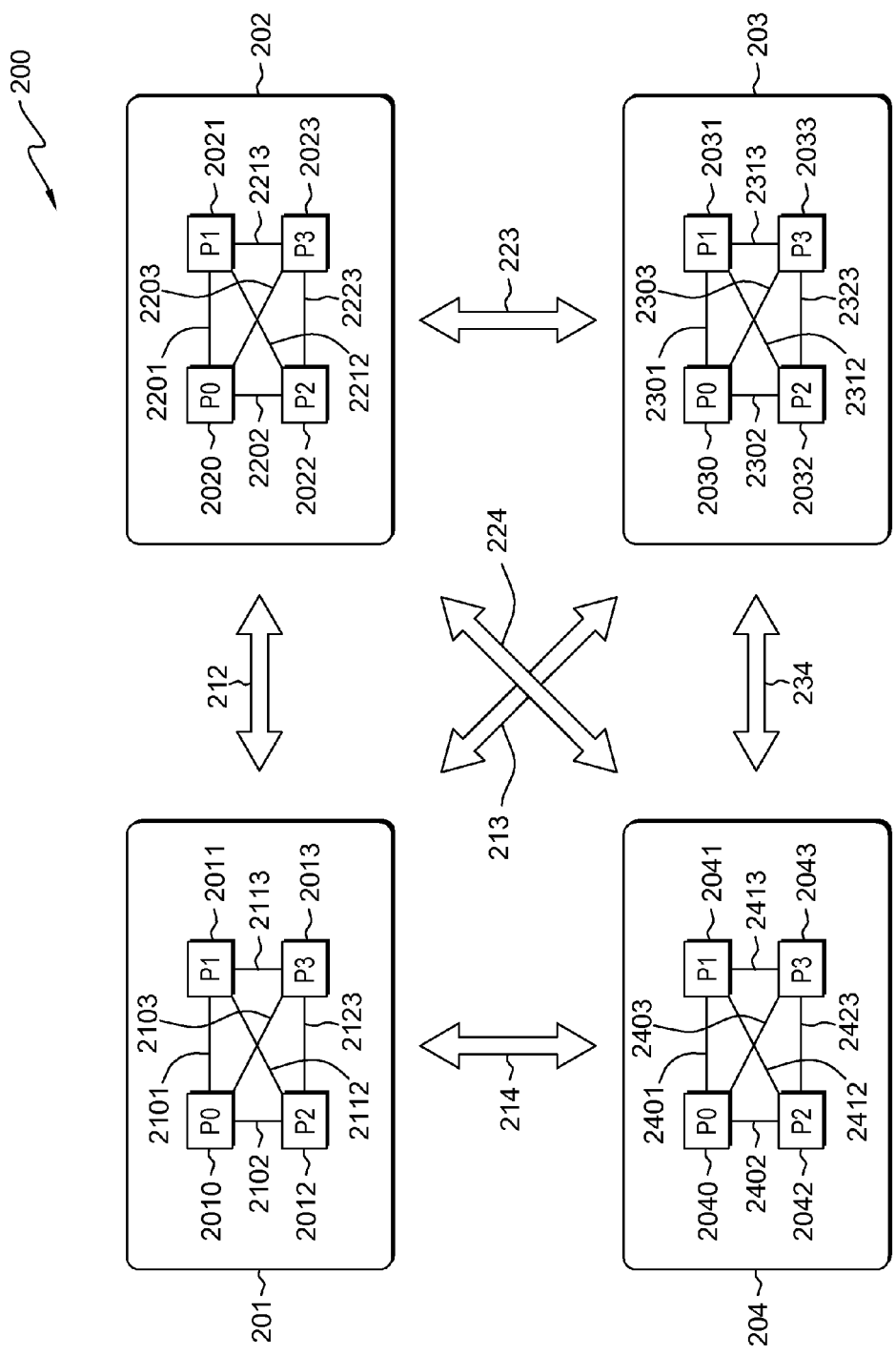
FIG. 2 is a functional block diagram illustrating a multi-node server architecture prior to implementing system management program 110, in accordance with an embodiment of the present invention.

FIG. 2 is functional block diagram illustrating a multi-node server architecture prior to implementing system management program 110, in accordance with an embodiment of the present invention.

Multi-node server architecture prior to implementing system management program 110 is depicted as architecture 200. The nodes can be a unit of hardware with a processor; memory; and internally and externally connected IO devices. Multiple units of such hardware are interconnected via inter-node cables (e.g., SMP cables). Nodes 201, 202, 203, and 204 are connected via SMP cables 212, 213, 214, 223, 224, and 234. Processors are located within a node and the processors are connected via intra-node buses or cables. For example, node 201 has processors 2010, 2011, 2012, and 2013 which are connected to one another via intra-node cables 2101, 2102, 2103, 2112, 2113, and 2123. Node 202 has processors 2020, 2021, 2022, and 2023 which are connected to one another via intra-node cables 2201, 2202, 2203, 2212, 2213, and 2223. Node 203 has processors 2030, 2031, 2032, and 2033 which are connected to one another via intra-node cables 2301, 2302, 2303, 2312, 2313, and 2323. Node 204 has processors 2040, 2041, 2042, and 2043 which are connected to one another via intra-node cables 2401, 2402, 2403, 2412, 2413, and 2423.

Figure 3:
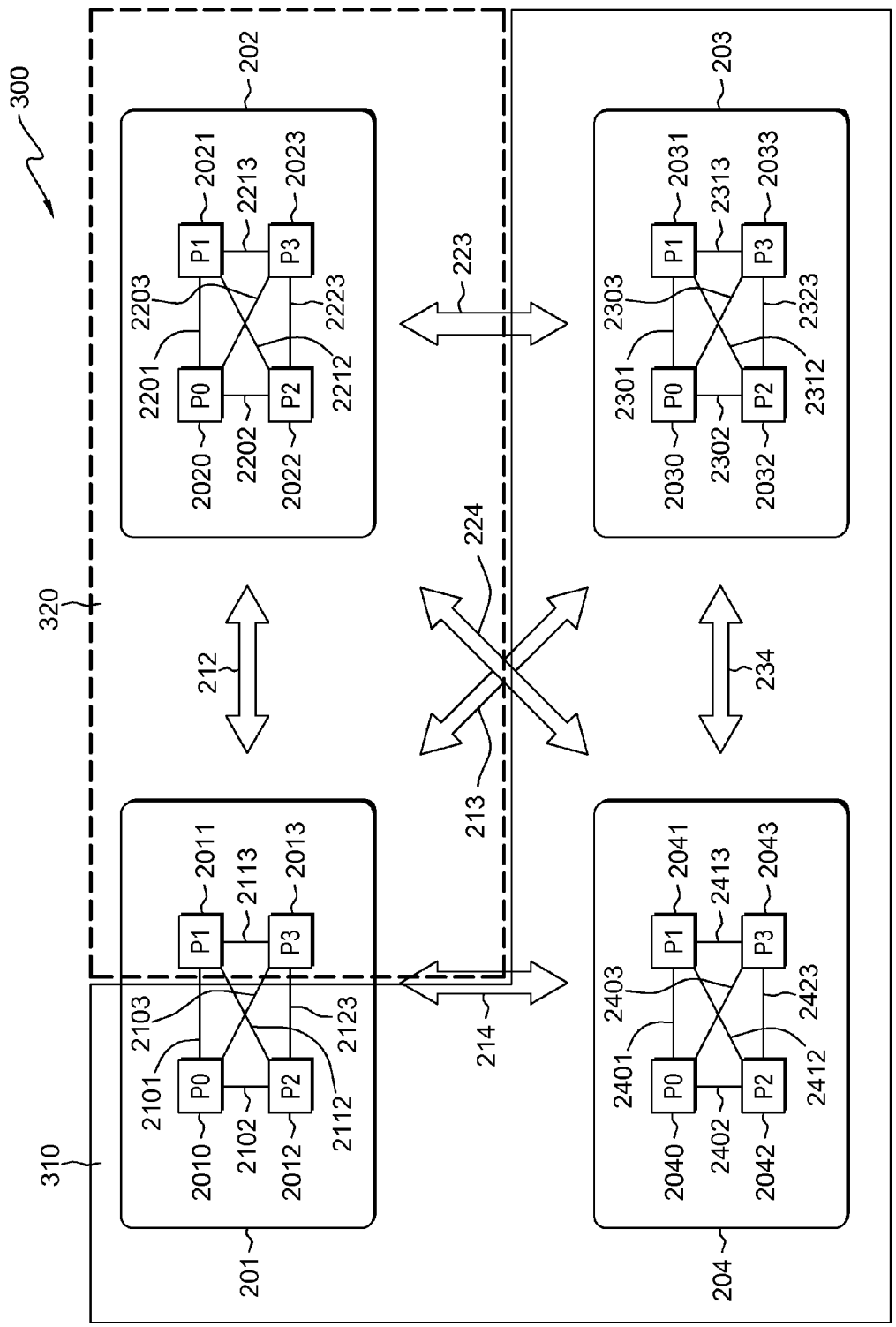
FIG. 3 is a functional block diagram illustrating an initial configuration of hosting two hypervisors spanning across nodes, in accordance with an embodiment of the present invention.

FIG. 3 is a functional block diagram illustrating an initial configuration of hosting two hypervisors spanning across nodes, in accordance with an embodiment of the present invention.

Each node of a multi-node server are booted in parallel until a certain point beyond which the SMP interconnects between the nodes are stitched. Thus, the nodes are part of a single SMP structure. The hypervisor image is then loaded on to the host memory. When the host memory is initializing, the host memory begins owning all the resources until any partitions are activated on the server. The partitions are created and activated on the server via system management program 110.

One of the possible plans is depicted in architecture 300 with two hypervisors—hypervisor 310 and hypervisor 320. Hypervisor 320 spans across node 201 and node 202 while hypervisor 310 spans across node 201, node 204, and node 203. Based on this plan, the inter-node buses and intra-node buses are configured by the service processor as: (i) the SMP buses (e.g., SMP cable 223) between node 202 and node 203 are completely de-configured; (ii) the SMP buses between node 204 and node 203 are completely configured; (iii) the SMP buses between node 201 and node 202 are partially configured such that only processors 2011 and 2013 of nodes 201 and processors 2021 and 2023 of node 202 are connected while the SMP buses between processors 2010 and 2012 of node 201 and processors 2020 and 2022 of node 202 are de-configured; (iv) the SMP buses between node 201 and node 204 is partially configured such that only processors 2010 and 2012 of node 201 and processors 2040 and 2042 of node 204 are connected while the SMP buses between processors 2011 and 2013 of node 201 and processors 2041 and 2043 of node 204 are de-configured; and (v) the intra-node SMP buses of intra-node cables 2101, 2103, 2123 and 2112 are de-configured. By de-configuring the interfaces between processors, the hypervisors are prevented from getting access to memory or resources belonging to the other hypervisors running on the same system.

Figure 4:
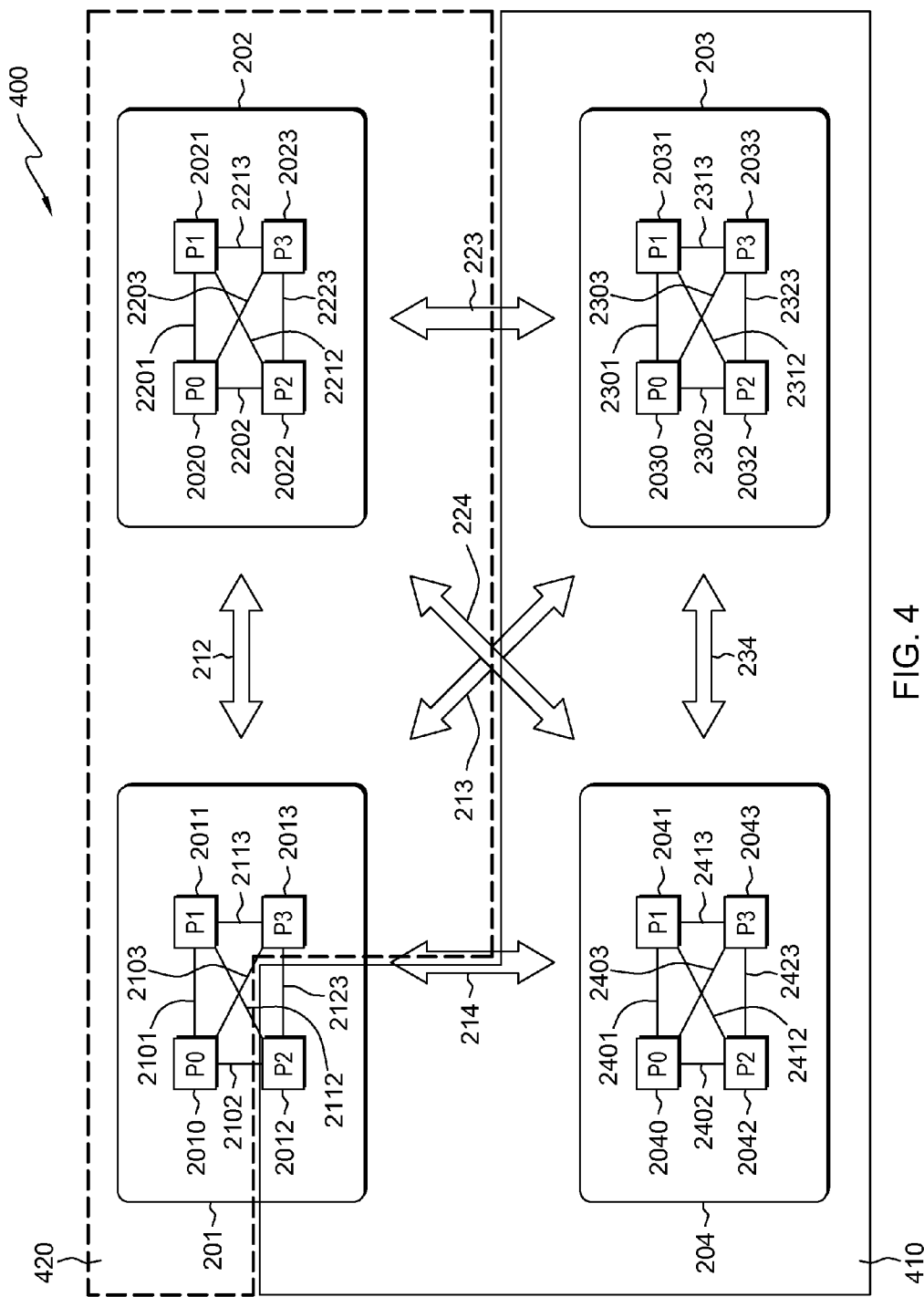
FIG. 4 is a functional block diagram illustrating a modification of the boundaries of the hypervisors during the implementation of system management program 110, in accordance with an embodiment of the present invention.

FIG. 4 is a functional block diagram illustrating a modification of the boundaries of the hypervisors during the implementation of system management program 110, in accordance with an embodiment of the present invention.

Once the multi-node server starts functioning, if the hypervisors requires more processors, then it places a request to the systems management tool via a service processor. The system management program along with the service processor will ask one of the hypervisors to relinquish the required resources. Once confirmed, the service processor will stitch the resource into the other hypervisor's pool of resources and inform the hypervisor to take control of the resource. Architecture 400 depicts an example where one of the hypervisors 420 spanning across node 201 and node 202 is expanding to processor 2010 on node 201. Based on this plan, the inter- and intra-node buses are configured by the service processor by: (i) configuring the intra-node SMP buses between processors 2010 and 2011; (ii) de-configuring the intra-node SMP buses between processors 2010 and 2012; (iii) configuring the intra-node SMP buses between processors 2010 and 2013; and (iv) configuring the inter-node SMP buses between processors 2010 and 2020

The hypervisors in FIG. 4 are acting on an architecture with same nodes, processors, inter-node SMP buses, and intra-node SMP buses as FIG. 3. Hypervisor 410 and hypervisor 420 correspond to different nodal regions compared to hypervisor 310 and hypervisor 320. Thus, the boundaries of the hypervisors have been modified from FIG. 3 to FIG. 4.

Figure 5:
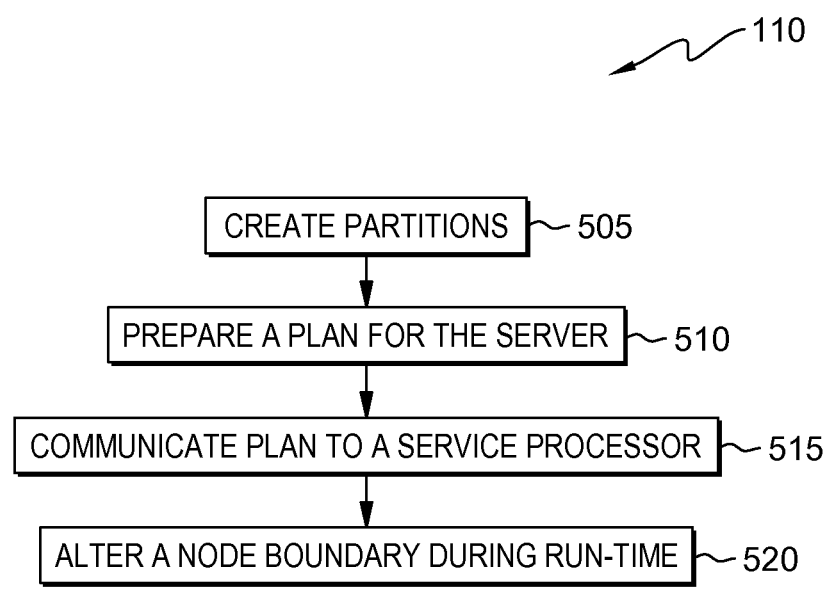
FIG. 5 is a flowchart depicting the operational steps to implement the functionalities of system management program 110, in accordance with an embodiment of the present invention.

FIG. 5 is a flowchart depicting the operational steps to implement the functionalities of system management program 110, in accordance with an embodiment of the present invention.

In step 505, system management program 110 creates partitions. Partitions are created offline even when the system management program 110 is not connected to the actual server. While creating the partitions, system management program receives instructions from the user to specify the following parameters: (i) resources required for the partition in terms of a processor, memory, network, and storage; (ii) special hardware requests (e.g., accelerators on a CAPI, preferred memory types, etc.); (iii) compatible hypervisor(s) where system management program 110 can receive a specific hypervisor on which the partition has to be launched on or a specified yet compatible hypervisor from a user.

In step 510, system management program 110 prepares a plan for the server. The plan for the server is based on the partitions created and partition parameters. System management program 110 determines a list of different hypervisors required for the plan. For example, in the instance of Power8, PowerVM and PowerKVM are the two required hypervisors. In some embodiments, there can be multiple instances of PowerVM or PowerKVM running on a server. In a cloud environment, if two customers don't want to share the same PowerVM instance, the two customers can have their own PowerVM instance. The partitions are grouped under the list of hypervisors. Those partitions, for which a user has already specified a hypervisor, are initially grouped. The total resources required by partitions assigned to each hypervisor, the hypervisor itself, and any supporting partitions (e.g., VIOS and any adjunct partitions) are computed. Based on the computed total resource requirement, the hypervisors are assigned to one or more nodes of the target multi-node server. For example, there is a four node Power8 server with 48 cores on each node. If a user wants PowerVM and PowerKVM as hypervisors and the resource requirements for PowerVM is 106 cores, then the system management program 110 assigns an instance of PowerVM hypervisor to three of the nodes and an instance of PowerKVM hypervisor to the fourth node. The following conflicts that may occur during the preparation of plan, are: (i) if the number of resources required for one of the hypervisor instances is not available, then the system management program 110 can either report the same hypervisor to the user and leave it to the user to resolve the conflict, or system management program 110 can use the priority of the partitions to pick partitions in a decreasing order of priority until the resources are exhausted on the server; (ii) if a certain partition needs a special hardware present in one of the nodes, then the hypervisor corresponding to the partition is mapped to the node with the special hardware; (iii) system management program 110 can put an advisory note to the user via the GUI to recommend "moving certain resources" (e.g., IO adapters, memory, or connecting an external IO drawer to a different node) between the drawers (i.e., nodes) to help optimize the utilization of resources and partitions among the hypervisors; (iv) computing the advisory note by analyzing the current server configuration versus the required system plan in order to activate the hypervisors and partitions; and (v) upon completion of first level of partition mapping of a node, the partitions (for which do not have specified hypervisor) are associated to a hypervisor based on the free resource availability on a particular type of node. These nodes are where hypervisors based on the free resource availability are currently placed in.

In step 515, system management program 110 communicates the plan (from step 510) to a service processor. The service processor boots each node independently until the nodes are ready to be stitched in SMP mode. Here, the service processor makes use of the plan given by the system management program 110 and accordingly continues to boot with the SMP configuration. If the systems management tool has assigned PowerVM to nodes 201, 202 and 203, and Power KVM to node 204, the service processor stitches nodes 201, 202 and 203 in SMP mode and leaves the node 204 as an independent node. The service processor then loads the PowerVM image to a pre-determined location in nodes 201, 202, and 203 and loads the PowerKVM image to a pre-determined location in node 204 and starts PowerVM in node 201 and PowerKVM in node 203. Prior to initiating the use of the hypervisors, the data pertaining to the configured and de-configured inter-node and intra-node buses is communicated via the hypervisor data structures. Thus, the hypervisors know which nodes can be accessed. The service processor establishes an independent interface connection to each of the hypervisor instances using the Host-Service Processor interface (e.g. a PSI unit found in a blade server).

In step 520, system management program 110 alters a (physical) node boundary during run-time. An example of an alteration of a physical node boundary during run-time is depicted in FIG. 4. Once a multi-node server starts functioning, if one of the hypervisors requires more processors, then the hypervisors place a request to the systems management tool via the service processor. Extending a node boundary at runtime will take into consideration the IO adapters attached to the processors and processor usage by the other hypervisors from where the processors are being taken. Alternatively, system management program 110 receives an instruction from a user to configure the node to the hypervisor mapping, statically via ASMI (i.e., a web based interface of the service processor). During the initial program load (IPL), the service processor (with the specified mapping) stitches and boots the nodes with the corresponding hypervisors. As the whole system is modelled as NUMA. (Non-uniform memory access (NUMA) is a computer memory design used in multiprocessing, where the memory access time depends on the memory location relative to the processor.) Asymmetrical topology between the nodes is considered acceptable with the NUMA solution.

Figure 6:
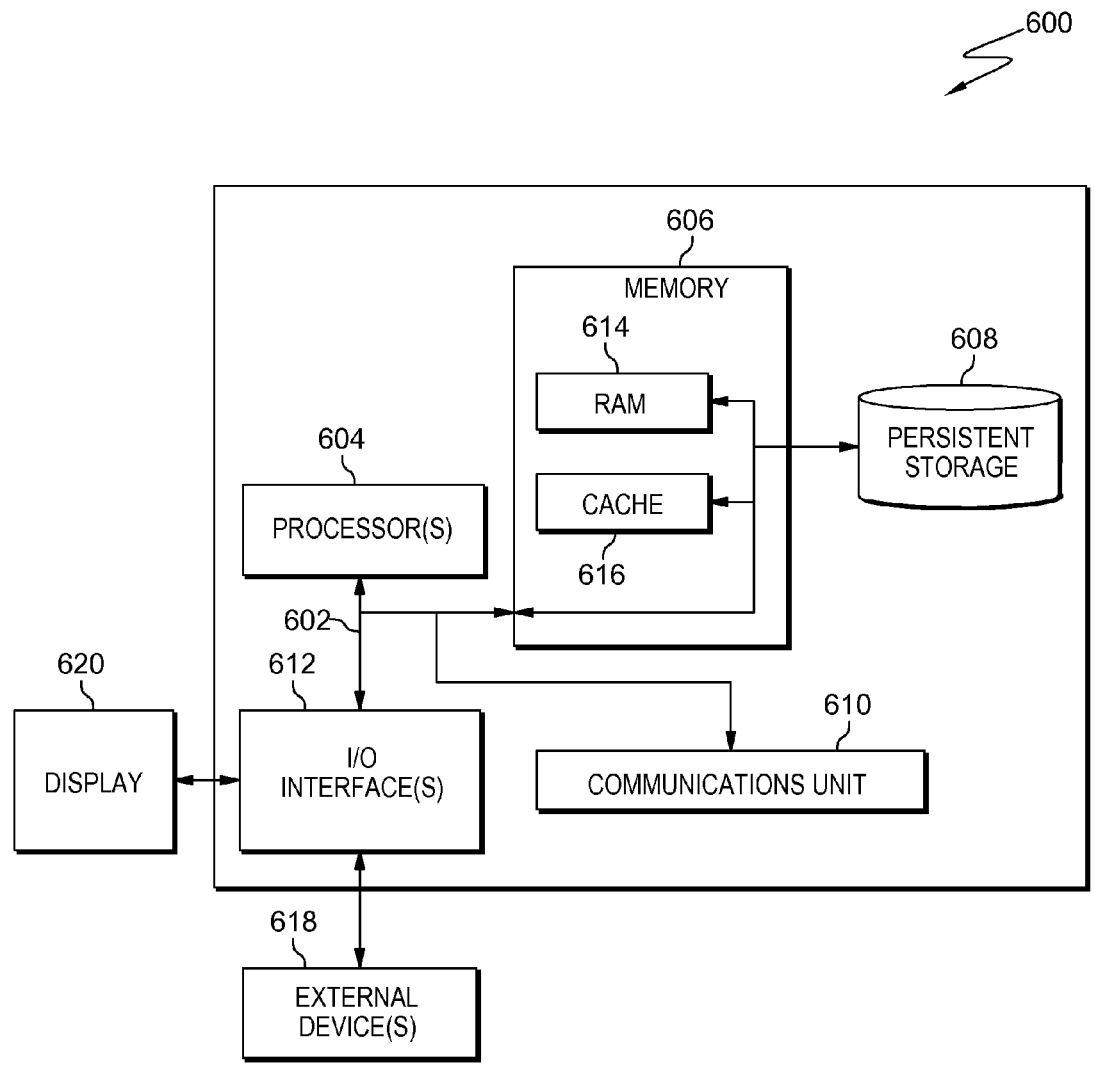
FIG. 6 depicts a block diagram of internal and external components of a computing device, in accordance with an embodiment of the present invention.

FIG. 6 depicts a block diagram of components of a computing device, generally designated 600, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Program instructions and data used to practice embodiments of the present invention may be stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to computing device 600. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for resource allocation, comprising the steps of:
    configuring, by one or more processors, a plan to utilize computer resources, wherein the plan is based on a set of one or more partitions;
    executing, by one or more processors, the plan to utilize the computer resources, based on: the set of one or more partitions, one or more hypervisors, computer resources, and one or more nodes of a target multi-node server;
    among the one or more hypervisors, applying, by one or more processors, a set of two or more hypervisors to the executed plan, wherein the set of two or more hypervisors use a single service processor, among a plurality of service processors;
    creating, by one or more processors, the set of one or more partitions of the computer resources, wherein creating the set of one or more partitions of the computer resources comprises:
        isolating granularity of the set of one or more partitions to a socket level; and
        enabling the set of one or more partitions to run the one or more hypervisors, wherein the one or more hypervisors simultaneously shift at least two node boundaries in response to modifications in a workload;
    configuring, by one or more processors, special hardware requested by the computer resources for execution of the plan;
    specifying, by one or more processors, which of the one or more hypervisors are configured to facilitate partitioning of the computer resources; and
    responsive to applying the set of two or more hypervisors which use the single service processor, controlling, by one or more processors, a boundary of the one or more nodes of the target multi-node server.

2. The method of claim 1, wherein executing the plan to utilize the computer resources, comprises:
    grouping, by one or more processors, the set of one or more partitions with the one or more hypervisors;
    computing, by one or more processors, an amount of the computer resources required by the set of one or more partitions grouped with the one or more hypervisors; and
    assigning, by one or more processors, the one or more hypervisors to the one or more nodes of the target multi-node server.

3. The method of claim 2, wherein assigning the one or more hypervisors to the one or more nodes of the target multi-node server, comprises:
    communicating, by one or more processors, information pertaining to a mapping of hypervisors to a node among the one or more nodes of the target multi-node server, to a service processor; and
    determining, by one or more processors, which nodes may be accessed and which nodes may not be accessed in accordance of the plan to utilize the computer resources.

4. The method of claim 1, wherein applying the set of two or more hypervisors, comprises:
    managing, by one or more processors, the set of two or more hypervisors, simultaneously;
    facilitating, by one or more processors, a co-existence of the set of two or more hypervisors used to run the same system with the single service processor, in order for the set of the two or more hypervisors to behave as two distinct servers; and
    shifting, by one or more processors, the node boundary of the one or more nodes of the multi-target server, during runtime of the executed plan upon: modifications in a workload and modifications to the single service processor.

5. The method of claim 1, wherein controlling the boundary of the one or more nodes, comprises:
    configuring, by one or more processors, connections between the one or more nodes within the target multi-node server; and
    de-configuring, by one or more processors, connections between the one or more nodes within the target multi-node server.

6. A computer program product for resource allocation, the computer program product comprising:
    a computer readable storage medium and program instructions stored on the computer readable storage medium, the program instructions comprising:
    program instructions to configure a plan to utilize computer resources, wherein the plan is based on a set of one or more partitions;
    program instructions to execute the plan to utilize the computer, based on: the set of one or more partitions, one or more hypervisors, computer resources, and one or more nodes of a target multi-node server;
    among the one or more hypervisors, program instructions to apply a set of two or more hypervisors to the executed plan, wherein the set of two or more hypervisors use a single service processor, among a plurality of service processors;

program instructions to create the set of one or more partitions of the computer resources comprise:
program instructions to isolate granularity of the set of one or more partitions to a socket level; and
program instructions to enable the set of one or more partitions to run the one or more hypervisors, wherein the one or more hypervisors simultaneously shift at least two node boundaries in response to modifications in a workload;

program instructions to configure special hardware requested by the computer resources for execution of the plan;

program instructions to specify which of the one or more hypervisors configured to facilitate partitioning of the computer resources; and responsive to applying the set of two or more hypervisors which use the single service processor, program instructions to control a boundary of the one or more nodes of the target multi-node server.

7. The computer program product of claim 6, wherein program instructions to execute the plan to utilize the computer resources, comprise:
program instructions to group the set of one or more partitions with the one or more hypervisors;
program instructions to compute an amount of the computer resources required by the set of one or more partitions grouped with the one or more hypervisors; and
program instructions to assign the one or more hypervisors to the one or more nodes of the target multi-node server.

8. The computer program product of claim 7, wherein program instructions to assign the one or more hypervisors to the one or more nodes of the target multi-node server, comprise:
program instructions to communicate information pertaining to a mapping of hypervisors to a node among the one or more nodes of the target multi-node server, to a service processor; and
program instructions to determine which nodes may be accessed and which nodes may not be accessed in accordance of the plan to utilize the computer resources.

9. The computer program product of claim 6, wherein the program instructions to apply the set of two or more hypervisors, comprise:
program instructions to manage the set of two or more hypervisors, simultaneously;
program instructions to facilitate a co-existence of the set of two or more hypervisors used to run the same system with the single service processor, in order for the set of the two or more hypervisors to behave as two distinct servers; and
program instructions to shift the node boundary of the one or more nodes of the multi-target server, during runtime of the executed plan upon: modifications in a workload and modifications to the single service processor.

10. The computer program product of claim 6, wherein program instructions to control the boundary of the one or more nodes, comprises:
program instructions to configure connections between the one or more nodes within the target multi-node server; and
program instructions to de-configure connections between the one or more nodes within the target multi-node server.

11. A computer system for resource allocation, the computer system comprising:
one or more computer processors;
one or more computer readable storage media; and
program instructions stored on the one or more computer readable storage media for execution by at least one of the one or more processors, the program instructions comprising:
program instructions to configure a plan to utilize computer resources, wherein the plan is based on a set of one or more partitions;
program instructions to execute the plan to utilize the computer resources, based on: the set of one or more partitions, one or more hypervisors, computer resources, and one or more nodes of a target multi-node server;
among the one or more hypervisors, program instructions to apply a set of two or more hypervisors to the executed plan, wherein the set of two or more hypervisors use a single service processor, among a plurality of service processors;
program instructions to create the set of one or more partitions of the computer resources comprise:
program instructions to isolate granularity of the set of one or more partitions to a socket level; and
program instructions to enable the set of one or more partitions to run the one or more hypervisors, wherein the one or more hypervisors simultaneously shift at least two node boundaries in response to modifications in a workload;
program instructions to configure special hardware requested by the computer resources for execution of the plan;
program instructions to specify which of the one or more hypervisors configured to facilitate partitioning of the computer resources; and
responsive to applying the set of two or more hypervisors which use the single service processor, program instructions to control a boundary of the one or more nodes of the target multi-node server.

12. The computer system of claim 11, further comprising:
program instructions to create the set of one or more partitions of the computer resources;
program instructions to configure special hardware requested by the computer resources for execution of the plan; and
program instructions to specify which of the one or more hypervisors configured to facilitate partitioning of the computer resources.

13. The computer system of claim 12, wherein the program instructions to create the set of one or more partitions of the computer resources, comprise:
program instructions to isolate granularity of the set of one or more partitions to a socket level; and
program instructions to enable the set of one or more partitions to run the one or more hypervisors, wherein the one or more hypervisors simultaneously shift at least two node boundaries in response to modifications in a workload.

14. The computer system of claim 11, wherein program instructions to execute the plan to utilize the computer resources, comprise:
program instructions to group the set of one or more partitions with the one or more hypervisors;

program instructions to compute an amount of the computer resources required by the set of one or more partitions grouped with the one or more hypervisors; and program instructions to assign the one or more hypervisors to the one or more nodes of the target multi-node server.

15. The computer system of claim 14, wherein program instructions to assign the one or more hypervisors to one or more nodes of a target multi-node server, comprise:

program instructions to communicate information pertaining to a mapping of hypervisors to a node among the one or more nodes of the target multi-node server, to a service processor; and program instructions to determine which nodes may be accessed and which nodes may not be accessed in accordance of the plan to utilize the computer resources.

16. The computer system of claim 11, wherein the program instructions to apply the set of two or more hypervisors, comprises:

program instructions to manage the set of two or more hypervisors, simultaneously;

program instructions to facilitate a co-existence of the set of two or more hypervisors used to run the same system with the single service processor, in order for the set of the two or more hypervisors to behave as two distinct servers; and program instructions to shift the node boundary of the one or more nodes of the multi-target server, during runtime of the executed plan upon: modifications in a workload and modifications to the single service processor.

17. The computer system of claim 11, wherein program instructions to control the boundary of the one or more nodes, comprises:

program instructions to configure connections between the one or more nodes within the target multi-node server; and program instructions to de-configure connections between the one or more nodes within the target multi-node server.

* * * * *